United States Patent Office 3,254,142
Patented May 31, 1966

3,254,142
PHOSPHOROUS ACID ESTERS
Gunter Oertel, Cologne-Flittard, Hans Holtschmidt, Cologne-Stammheim, and Rudolf Merten, Cologne-Flittard, Germany, assignors to Farbenfabriken Bayer Aktiengesellschaft, Leverkusen, Germany, a corporation of Germany
No Drawing. Filed Aug. 28, 1962, Ser. No. 220,076
Claims priority, application Germany, Sept. 1, 1961,
F 34,833
4 Claims. (Cl. 260—928)

This invention relates to phosphorous acid esters and more particularly to phosphorous acid ester polyols.

The reaction of trialkyl phosphites with glycols has been proposed heretofore, but these reactions are known to lead to cyclic triesters of phosphorous acid. U.S. Patent 2,841,408 describes the transesterification of triphenyl phosphite with ethylene glycol in the mole ratio of two mols of phosphite per mol of glycol and discloses that the reaction leads to the following compound:

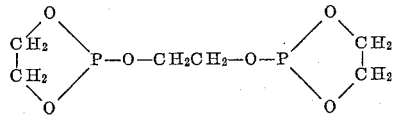

According to U.S. Patent 2,961,454, the bicyclic phosphite of the formula

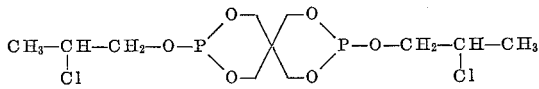

is obtained in similar manner from 2 mols of tri-(2-chloropropyl)-phosphite and 1 mol of pentaerythritol. These cyclic triesters of phosphorous acid do not have free hydroxyl groups and their use, therefore, as reactive intermediates in chemistry requiring the presence of free hydroxyl groups, is impossible. The compounds prepared by the prior art methods are not useful in the preparation of epoxide resins, for example.

It is, therefore, an object of this invention to provide phosphorous acid esters having free hydroxyl groups. A further object of this invention is to provide substantially water-white, essentially colorless oils based on phosphorous acid which have free hydroxyl groups suitable for the preparation of plastics through polyaddition reactions. Still another object of this invention, is to provide an improved process for the preparation of phosphorous acid esters which have free hydroxyl groups. A further object of the invention is to provide esters of phosphorous acid which are substantially free of cyclic linkages. Another object of the invention is to provide a process for the preparation of phosphorous acid esters while avoiding cyclization.

The foregoing objects and others which will become apparent from the following description are accomplished in accordance with the invention, generally speaking, by providing phosphorous acid esters, prepared by a process which comprises reacting a trialkyl phosphite with a polyhydric alcohol in such proportions that more than 2 and less than 6 equivalents of —OH are present per mol of said trialkyl phosphite, said phosphorous acid esters containing at least two phosphite groupings per molecule. Thus, this invention contemplates the transesterification of trialkyl phosphites with polyhydric alcohols preferably at a temperature within the range of from about 60° C. to about 180° C. and preferably under partially reduced pressure and essentially in such proportions that more than 2 and less than 6 equivalents of —OH are present per mol of said trialkyl phosphite, so that a phosphorous acid ester polyol containing at least two phosphite groupings per molecule, is obtained.

The term "trialkyl phosphites" as used herein and in the claims includes any compound having the formula $P(OR)_3$ wherein R is an alkyl, haloalkyl, aralkyl, cycloalkyl or haloaralkyl radical. Any suitable trialkyl phosphite may be used, such as, for example, trimethyl phosphite, triethyl phosphite, tripropyl phosphite, tributyl phosphite, methyl diethyl phosphite, butyl diethyl phosphite, tricyclohexyl phosphite, tri-(2 - chlorocyclohexyl) - phosphite, cyclohexyl di-(2-chlorocyclohexyl)-phosphite, tri-(beta-chloroethyl)-phosphite, tri-(2-bromopropyl)-phosphite, tri-(2-chloropropyl)-phosphite, tri-(benzyl)-phosphite, benzyl dimethyl phosphite, tri-(4-chlorobenzyl)-phosphite, tri-(4-bromobenzyl)-phosphite. The preferred trialkyl phosphite, because of commercial availability and ease of reaction, is tri-(beta-chloroethyl)-phosphite.

Any suitable polyhydric alcohol may be used. It is preferred to use those polyhydric alcohols which have from 2 to 6 hydroxyl groups and a molecular weight below about 5000. Most preferred are the polyalkylene ethers having 2 to 4 hydroxyl groups such as, for example, diethylene glycol, triethylene glycol, the reaction product of one mol of glycerine with 3 mols of ethylene oxide, the reaction product of 1 mol of pentaerythritol with 3 mols of propylene oxide, polypropylene ether glycol, such as, for example, polypropylene ether glycol having a molecular weight of 250 and the like. Other suitable alcohols, having 2 to 6 hydroxyl groups and having a molecular weight below about 5000 are, for example, 1,4-butane diol, 1,6-hexane diol, 1,4-butene diol, 1,4-butine diol, oxyalkylated phenols such as, for example, the reaction product of hydroquinone with 2 mols of ethylene oxide to produce the bis-(beta hydroxy)-ethylene ether of hydroquinone, amino alcohols having only free hydroxyl groups such as N-methyl diethanol amine, triethanol amine, and the like, hydroxy alkyl esters of polycarboxylic acids, such as, for example, the reaction product of 2 mols of 1,3-propylene glycol with 1 mol of adipic acid, the reaction product of 3 mols of ethylene glycol with 1 mol of 1,3,5-benzene tricarboxylic acid, the reaction product of 2 mols of 1,4-butane diol with 1 mol of sebacic acid, 2,2'-dihydroxy dialkyl sulphides and disulphides such as, for example, thiodiglycol, bis-beta hydroxy ethyl disulphide, and the like. In addition, you may use polyhydroxyl esters and polyhydric polyethers which have a molecular weight below about 5000 prepared from the condensation of an excess of a polyhydric alcohol such as ethylene glycol, propylene glycol, 1,4-butane diol, trimethylol propane, glycerine, pentaerythritol and the like, with a polycarboxylic acid such as, for example, adipic acid, succinic acid, sebacic acid, 1,4-benzene dicarboxylic acid, and the like, or by the condensation of an alkylene oxide such as, for example, ethylene oxide, propylene oxide, 1,2-butylene oxide, styrene oxide, epichlorohydrin either alone or with one of the polyhydric alcohols disclosed for the preparation of polyesters. The polyhydric alcohols such as ethylene glycol, trimethylene glycol, trimethylol propane, pentaerythritol, glycerine - 1 - pentachlorophenyl ether and the like can also be used, but they are not preferred since they exhibit more tendency to ring closure with the trialkyl phosphite, even in the critical proportions specified, than the polyalkylene ether type of polyhydric alcohol. The preferred polyhydric alcohols having from 2 to 4 free hydroxyl groups are polyalkylene ether polyols most preferably having a molecular weight of about 90 to about 500 such as diethylene glycol, triethylene glycol, the reaction product of pentaerythritol with 3 mols of ethylene glycol and the like. The polyhydric alcohols may be substituted with various radicals such as halogen, for example, chlorine, bromine, iodine or the like; nitro, alkoxides such as methoxy, ethoxy, propoxy or the like, carboxylic acid esters such as carbomethoxy, carbethoxy and the like, as well as others.

The process of the invention involves a transesterification reaction between the trialkyl phosphite and the polyhydric alcohol so that the alkyl radical from the phosphite splits off in the form of the corresponding alcohol and under the preferred conditions of the process of the invention, is distilled off at the reaction temperature under reduced pressure. It is preferred to employ conditions so that the alcohol which is liberated from the phosphite is continuously distilled off and removed from the reaction mixture. For this reason, it is preferred to carry out the reaction under partially reduced pressure. The transesterification can be effected in various ways; it is possible to either introduce the polyhydric alcohol into the trialkyl phosphite which has been previously heated to the required temperature, or vice versa. Alternatively, if the physical properties of the raw materials permit, the trialkyl phosphite and the polyhydric alcohol may be combined and then heated to the required temperature until the desired degree of transesterification is reached.

The essential feature of the invention is that the trialkyl phosphite and the polyhydric alcohol must be combined in such proportions that there are more than 2 and less than 6 equivalents of —OH present per mol of trialkyl phosphite. Moreover, it is preferred to choose this ratio so that 3 to 5 equivalents of hydroxyl groups are used per mol of trialkyl phosphite. If the preferred reaction conditions are maintained; i.e., a temperature of 60–180° C. under partially reduced pressure, then a true polyhydric phosphorous acid ester having at least two phosphite groupings per molecule is obtained. If these conditions are not maintained, and if two or less than 2 equivalents of —OH per mole of trialkyl phosphite are used, then the resulting product does not contain free hydroxyl groups in the molecule. It is true that polyphosphites are obtained, but like the known polyphosphites referred to above, they contain no free hydroxyl groups in the molecule. On the other hand, if six equivalents or more of the hydroxyl groups are used per mol of trialkyl phosphite, then a product will be obtained which has free hydroxyl groups. But these are not polyphosphites but compounds of low molecular weight with only one trialkyl phosphite grouping in the molecule. When following the process of the invention using the proportions specified, polyphosphites containing at least two phosphite groups in the molecule are obtained.

The smooth formation of polyesters of phosphorous acid and containing hydroxyl groups by the process according to the invention is surprising. Having regard to the state of the art, it was certainly to be expected that, because of the unusually easy transesterification of the trialkyl phosphites, with the action of more than 2 equivalents of hydroxyl groups in the form of the said polyhydroxyl compounds on 1 mol of trialkyl phosphite at high temperature, there would be a complete transesterification with all the alcohol contained in the trialkyl phosphite being split off. Now since the complete reaction of a trifunctional compound, perhaps trialkyl phosphite, with an at least bifunctional compound, perhaps the polyhydroxyl compound, usually leads to a cross-linking, the formation of a soluble, substantially linear poly-trialkyl phosphite containing hydroxyl groups was not to be expected under the conditions of the process according to the invention. Despite the presence of free hydroxyl groups in the reaction system, the transesterification reaction could even be conducted in such a way that only some of the monoalcohol originally present in the monomeric trialkyl phosphite, advantageously 2 mols of mono-alcohol from 1 mol of the trialkyl phosphite being used, is removed by transesterification, while the third alkoxy group remains on the phosphorous and thus the possibility is provided for the formation of substantially linear polyesters of phosphorous acid with terminal hydroxyl groups, said polyesters being of high molecular weight. It is to be particularly mentioned in this connection that triaryl esters of phosphorous acid, such as triphenyl phosphite instead of trialkyl phosphites, show a completely different behavior with respect to polyhydroxyl compounds under the conditions of the process according to the invention, and in each case produce the cross-linked and insoluble products which are to be expected. The transesterification between trialkyl phosphites and polyhydroxy compounds according to the present process is preferably effected as far as possible with exclusion of water in order to avoid a hydrolysis of the trialkyl phosphites to dialkyl phosphites. Catalysts are generally not necessary during the transesterification, but alkali or even acid catalysts can be used, such as, for example, sodium hydroxide, potassium hydroxide, $HBF_4$, HCl and the like.

The phosphorous acid esters of the invention preferably have a hydroxyl number within the range of from about 30 to 800. They are generally water white, essentially colorless, condensation products which can be used advantageously as intermediates in the production of epoxide resins and as lubricants. Moreover, they are suitable as plasticizers and stabilizers for polymers which contain halogen. In particular, they may be used as a lubricant where substantially nonflammable lubricants are required, such as, for example, in the lubrication of moving parts of stokers, and the like.

The invention is further illustrated by the following examples in which the parts are by weight unless otherwise specified.

Example 1

About 150 parts (1 mol) of triethylene glycol are added dropwise to about 540 parts (2 mols) of technical tri-(beta-chlorethyl)-phosphite at about 120° C. under partial vacuum. A vigorous reaction occurs and ethylene chlorhydrin is distilled off under partial vacuum. After approximately the theoretical quantity, i.e., about 160 parts of ethylene chlorhydrin have distilled off, approximately another 375 parts (2.5 mols) of triethylene glycol are gradually introduced dropwise at about 120 to 130° C. into the reaction mixture, the splitting-off of ethylene chlorhydrin proceeding continuously. When all the triethylene glycol has been introduced dropwise, the reaction temperature is raised to about 145° C. and kept at this temperature until no more ethylene chlorhydrin distils off under partial vacuum. A total of about 296 parts of ethylene chlorhydrin is distilled off in the transesterification. As residue, there are obtained about 768 parts of the corresponding phosphorous ester as a colorless oil (OH number about 233).

Example 2

About 330 parts (2.2 mols) of triethylene glycol are slowly introduced dropwise into about 540 parts (2 mols) of tri-beta-chlorethyl)-phosphite at about 120 to 130° C. The ethylene chlorhydrin forming with the transesterification is simultaneously distilled out of the reaction mixture under partial vacuum.

After all the triethylene glycol has been added dropwise, the reaction temperature is raised to about 145° C. until no more ethylene chlorhydrin distills off. When the total quantity of ethylene chlorhydrin which has distilled off has reached about 269 parts, there is obtained as residue about 602 parts of polyester as a colorless oil (OH number about 109).

Example 3

About 540 parts (2 mols) of technical tri-(beta-chlorethyl)-phosphite are reacted with a total of about 600 parts (4 mols) of triethylene glycol, as described in Example 2. A total of about 300 parts of ethylene chlorhydrin is split-off. As residue, there are obtained about 830 parts of a colorless polyester (viscosity about 340 cp./20° C., OH number about 266).

*Example 4*

A mixture of about 540 parts (2 mols) of technical tri-(beta-chlorethyl)-phosphite and about 600 parts (4 mols) of triethylene glycol is slowly heated under partial vacuum while stirring. At about 90° C. transesterification commences with ethylene chlorhydrin being vigorously split-off, the transesterification being completed over a period of about 5 hours by gradually raising the temperature to about 150° C. About 395 parts of ethylene chlorhydrin are split-off. In the residue, there remain about 740 parts of the corresponding phosphorous ester in the form of a colorless clear oil (OH number about 197).

*Example 5*

A mixture of about 340 parts (1 mol) of glycerine-1-pentachlorophenyl ether and about 450 parts (3 mols) of triethylene glycol is added dropwise over a period of several hours to about 540 parts (2 mols) of tri-(beta-chloroethyl)-phosphite at about 100 to 120° C. About 410 parts of ethylene chlorhydrin distil off under partial vacuum. Thereafter, the reaction mixture is heated for approximately 2 more hours to about 150° C. under partial vacuum in order to remove the last traces of the ethylene chlorhydrin in the mixture. The residue is a colorless oil (about 910 parts, viscosity about 1125 cp./20° C., OH number about 191).

*Example 6*

First of all, about 118 parts (1 mol) of 1,6-hexane diol are added dropwise to about 540 parts (2 mols) of tri-(beta-chlorethyl)-phosphite at about 120° C. Ethylene chlorhydrin is then split-off violently and is distilled off under partial vacuum. After about 150 parts of ethylene chlorhydrin have distilled off, approximately another 236 parts of 1,6-hexane diol are added drop-wise while gradually raising the reaction temperature to about 140° C. the distillation of the simultaneously forming ethylene chlorhydrin continuing. A total of about 364 parts of ethylene chlorhydrin distil off. The polyester remaining in the residue (about 523 parts) is a colorless oil (OH number about 195).

*Example 7*

About 120 parts of triethylene glycol are added to about 66.4 parts of triethyl phosphite at about 120 to 130° C. while simultaneously passing through nitrogen, this taking about 3 hours. During this time, about 54 parts of ethanol distil off. After all the triethylene glycol has been added dropwise, the transesterification is completed by brief heating to about 145° C. and while applying vacuum. About 137 parts of the corresponding phosphorous ester (OH number about 183) remain in the residue.

*Example 8*

About 66.4 parts of triethyl phosphite are reacted as described in Example 7 with a mixture of about 100 parts of triethylene glycol and about 20 parts of glycerine-alpha-chlorhydrin. A total of about 53 parts of ethanol distil off, the residue (about 135 parts) being a colorless oil (OH number about 190).

*Example 9*

About 150 parts of triethylene glycol are added dropwise to a mixture of about 66.4 parts of triethyl phosphite and about 27 parts of trichlorethyl phosphite at about 120 to 130° C. The mixture of ethanol and ethylene chlorohydrin being liberated by transesterification is distilled off, as it forms, under reduced pressure. After about 60 parts of the alcohol mixture have been distilled off, the transesterification ceases. By brief heating to about 150° C. under substantially complete vacuum, the reaction is terminated. About 176 parts of the corresponding phosphorous ester (—OH number 271) remain in the residue.

It is to be understood that the foregoing working examples are given for the purpose of illustration, and that any other suitable trialkyl phosphite, polyhydric alcohol, catalyst or the like, could have been used therein provided the teachings of this disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A substantially linear phosphorous acid ester having free hydroxyl groups and at least two phosphite groups per molecule which has been prepared by a process which comprises transesterification at a temperature of from about 60° C. to about 180° C. of a tri-(beta-haloalkyl)-phosphite wherein halo is selected from the group consisting of chlorine and bromine, with a polyhydric alcohol having 2 to 6 hydroxyl groups and a molecular weight below about 5000 in such proportions that more than 2 and up to about 5 equivalents of —OH are present per mol of said tri-(beta-haloalkyl)-phosphite, so that two mols of monohydric alcohol are removed by transesterification to prepare a substantially linear phosphorous acid ester having one halo-alkoxy group per phosphite group.

2. The phosphorous acid ester of claim 1 wherein said tri-(beta-haloalkyl)-phosphite is tri-(beta-chloroethyl)-phosphite.

3. The phosphorous acid ester of claim 1 wherein said polyhydric alcohol is a polyethylene glycol having a molecular weight of from about 90 to about 500.

4. The phosphorous acid ester of claim 1 wherein said polyhydric alcohol has two to four hydroxyl groups.

References Cited by the Examiner

UNITED STATES PATENTS

| | | | |
|---|---|---|---|
| 2,353,558 | 7/1944 | Gzemski | 260—461.315 |
| 2,961,454 | 11/1960 | Gould et al. | 260—461.315 |
| 3,047,608 | 7/1962 | Friedman et al. | 260—461.303 |
| 3,053,878 | 9/1962 | Friedman et al. | 260—461.303 |
| 3,056,824 | 10/1962 | Hecker et al. | 260—461.315 |
| 3,081,331 | 3/1963 | Friedman | 260—461.303 |
| 3,082,189 | 3/1963 | Mack et al. | 260—461.303 XR |

FOREIGN PATENTS 136,347   7/1960   Russia.

CHARLES B. PARKER, *Primary Examiner.*

LEWIS GOTTS, IRVING MARCUS, *Examiners.*